United States Patent [19]

Hayter et al.

[11] Patent Number: 5,734,650

[45] Date of Patent: Mar. 31, 1998

[54] ATM QUEUING AND SCHEDULING APPARATUS

[75] Inventors: Andrew Timothy Hayter, Bitterne Park; Simon Paul Davis, Romsey; Paul Parshee Momtaham, Cheadle Hulme, all of England

[73] Assignee: Roke Manor Research Limited, England

[21] Appl. No.: 536,952

[22] Filed: Sep. 29, 1995

[30] Foreign Application Priority Data

Sep. 30, 1994 [GB] United Kingdom ............... 9419802.5
May 19, 1995 [GB] United Kingdom ............... 9510138.2

[51] Int. Cl.⁶ .................................................. H04L 12/54
[52] U.S. Cl. ...................... 370/391; 370/392; 370/395; 370/414; 370/418
[58] Field of Search ................................ 370/389, 391, 370/395, 397, 412, 413, 414, 417, 418, 428, 429, 252, 253

[56] References Cited

U.S. PATENT DOCUMENTS 5,400,336  3/1995  Boyer ................................ 370/232
5,497,375  3/1996  Hluchyj et al. ..................... 370/253
5,570,360  10/1996 Klausmeier et al. ............... 370/395
5,602,830  2/1997  Fichou et al. ...................... 370/232

OTHER PUBLICATIONS

Verma DC et al. "First International Workshop on Network and Operating System Support", 1990 Int. Comp Sci Inst. Guaranteeing Delay Jitter Bounds in Packet–Switching Networks.

*Primary Examiner*—Douglas W. Olms
*Assistant Examiner*—Ricky Q. Ngo
*Attorney, Agent, or Firm*—Hill, Steadman & Simpson

[57] ABSTRACT

An apparatus for queuing and scheduling ATM cells across an ATM switch comprises sustainable cell rate calendar connected in series with a peak cell rate calendar wherein cells are scheduled independently in each. The sustainable cell rate calendar guarantees the maximum ATM cell delay is not exceeded. The ATM cells are not placed on the peak cell rate calendar unless the peak cell rate threshold might be exceeded. In this case the cell is scheduled on the peak cell rate calendar and it is this that determines when the cell is sent. In this way, it is possible to guarantee absolute minimum and maximum cell rates of a connection.

1 Claim, 2 Drawing Sheets

ATM QUEUING AND SCHEDULING APPARATUS

BACKGROUND OF THE INVENTION

1. Field of the Invention

The present invention relates to communication systems and, more particularly, the present invention relates to an apparatus for queuing and scheduling ATM cells in an ATM switch.

2. Description of the Related Art.

ATM networks and switches support a mixture of traffic including bursty traffic. By its nature, bursty traffic requires high bit rates for part of the time and little or no bit rate for the rest of the time. In order to efficiently use the bit rate available in a network, it is necessary to allocate a connection at a lower bit rate than the peak bit rate, such that the total peak rate of all the connections may be greater than the bit rate of the network links.

German Patent Application No. 93120828.4 describes a method of providing an output of ATM cells whereby the sustainable cell rate as defined in the ATM Forum User Network Interface (UNI) specification, version 3.0, is guaranteed. By using a leaky bucket method, as described in the ATM Forum UNI specification, version 3.0, each ATM cell has the time of transmission from the system calculated by identification of its virtual channel identifier/virtual path identifier (VCI/VPI) field, or other similar method which uniquely identifies ATM cells belonging to the same communication connection. This transmission time is provided as a delay value and is used to schedule the ATM cell on a calendar, which is effectively a time scheduler.

The problem with the method described in this German patent application, is that it does not limit the minimum delay. ATM cells can be transmitted at up to the maximum bit rate of the network link. This means that the cells can exceed the peak cell rate (PCR) of the connection as defined in the ATM Forum UNI specification, version 3.0.

GB Patent Application No. 9405788.2 describes another method which uses two calendars. The first calendar, as in the above mentioned German patent application, guarantees the sustainable cell rate, by scheduling ATM cells according to the sustainable cell rate leaky bucket delay value. This calendar is called the sustainable cell rate (SCR) calendar. A second calendar is used which limits the peak cell rate. The second calendar is called the peak cell rate (PCR) calendar and schedules the cells according to their PCR delay value. Although there are two calendars, each ATM cell is stored only once. Each ATM cell is pointed to from both calendars. The second calendar has some distinct differences in the way it operates as follows:

The SCR calendar has two time pointers, a real time read pointer (T) and a read pointer (RP).

The PCR calendar has only one pointer, a real time read pointer (T).

The SCR calendar read pointer will move from one filled time slot to the next filled time slot. For both SCR and PCR calendars, the real time read pointer will only move by one time slot each ATM cell transmission period.

Once the real time read pointer of the PCR calendar has passed a time slot, it will remove the pointer from the ATM cell, returning it to a null value. This is the key for the SCR calendar to transmit the cell from the system when it arrives.

The system is intended to limit the ATM cell rate for a specific connection to be within its specified threshold for the sustainable cell rate and the peak cell rate, that is the maximum and minimum ATM cell rate.

There is a problem with the above mentioned prior art system, in that, in a specific situation it is possible that the peak cell rate may exceed the PCR value set. This occurs if there is sudden change in the usage of the system from high to low usage.

In a high load situation, the real time reader pointer moves from cell slot to cell slot removing the PCR pointer from cells. However, the cells are actually transmitted from the system based on the read pointer, which in a high load situation will operate at a slow rate. It is possible that the real time read pointer on the PCR calendar may remove the PCR pointer from several ATM cells all belonging to the same connection before the read pointer of the SCR calendar sends them. If the system enters a low load period, the read pointer will run faster and send any ATM cells with a null PCR pointer. There is therefore the opportunity to send ATM cells from the same connection at a greater ATM cell rate than the PCR value.

One exemplary object of the present invention is to provide ATM queuing and scheduling apparatus which does not suffer from the above mentioned problem. Other objects and advantages of the present invention will be apparent from the following summary and detailed description of the invention.

SUMMARY OF THE INVENTION

The present invention provides an apparatus for queuing and scheduling ATM cells connected to an output side of an ATM switch. The system of the present invention comprises first and second calendars connected in series, wherein the first calendar is used to schedule cells for transmission in accordance with a maximum delay value, and the second calendar is used to schedule cells for transmission in accordance with a minimum delay value. A comparator means determines when a cell is to be scheduled on the second calendar.

BRIEF DESCRIPTION OF THE DRAWINGS

The preferred embodiment of the present invention will now be described with reference to the accompanying drawings, in which.

DETAILED DESCRIPTION OF THE PREFERRED EMBODIMENTS

Figure 1:
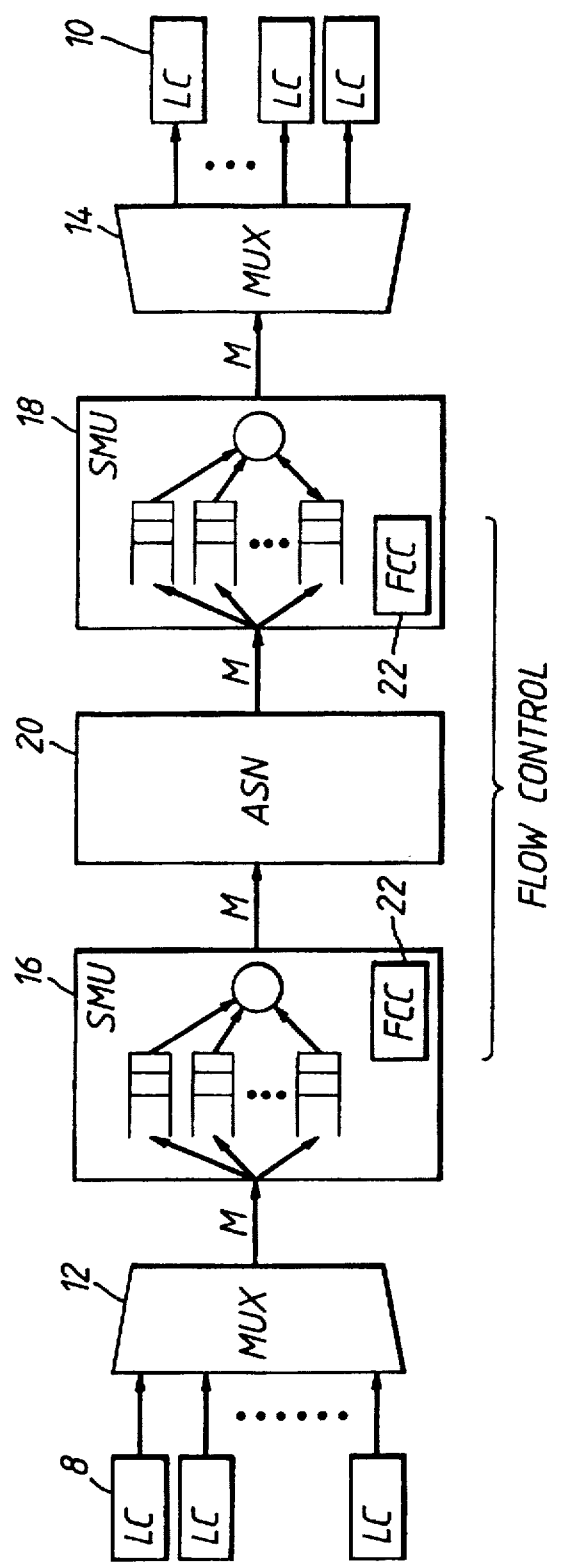
FIG. 1 illustrates a block diagram of a typical ATM switch.

Referring to FIG. 1, on the input side are shown line cards 8, the outputs of which are connected to an input of an ATM multiplexer 12. The output of the multiplexer 12 is connected to an input of a statistical multiplexing unit 16, the output of which is fed to the ATM switching network 20. The output of the switching network 20 is connected to an input of a further statistical multiplexing unit 18, the output of which is connected to an input of an ATM multiplexer 14. The outputs of the ATM multiplexer 14 are connected to the input of a number of line cards 10 which are on the output side of the switching network. The links between the various components designated M represent multiplexed internal links. Each statistical multiplexing unit has a flow control controller 22. The combination, for example, of the line cards 8, multiplexer 12 and statistical multiplexing unit 16 comprises a peripheral switch group. In practice there will be a number of peripheral switch groups connected to the ATM switching network. Within each statistical multiplexing unit 16 there is one input queue for each of the peripheral switch groups attached to the ATM switching network. Cells may be sent independently between any of the peripheral switch groups. Limiting factors control the cell rate, which are the output link bit rate from the ATM switching network to a peripheral switch group, and the output link bit rate from a peripheral switch group to the ATM switching network.

Flow control procedures operate to manage these limited bit rates fairly for all connections, both internally to the switch and between the peripheral switch groups, and to limit bit rate to peak reservation across the ATM switching network.

Figure 2:
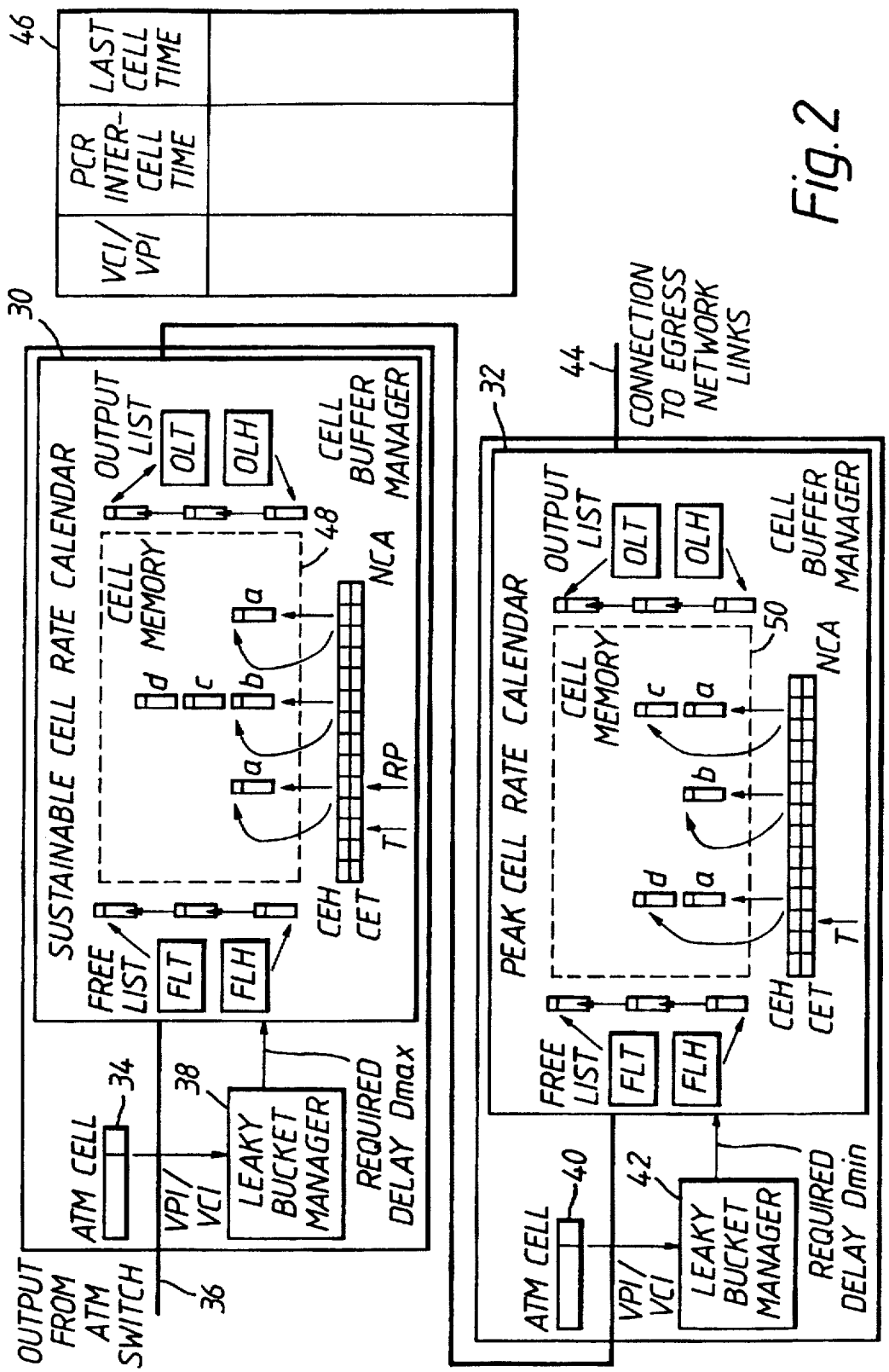
FIG. 2 illustrates a sustainable bit rate calendar and a peak bit rate calendar connected in series, together associated with a table which is used to identify the VCI/VPI, the PCR intercell time and the last cell time.

The present invention is conveniently located in the statistical multiplexing unit 18 and will now be described. Referring to FIG. 2, there is shown a sustainable bit rate calendar 30 serially connected to a peak bit rate calendar 32. ATM cells 34 are received over a line 36 from the ATM switch of FIG. 1, and are processed by a leaky bucket manager circuit 38, which is used to generate the required maximum delay Dmax. The ATM cells 40 which are fed out from the sustainable bit rate calendar 30, are processed by a leaky bucket manager circuit 42, to provide the required minimum delay Dmin.

In FIG. 2, the following abbreviations are used, FLT is the Free List Tail, FLH is the Free List Head, CET is the Calendar Entry Tail, CEH is the Calendar Entry Head, RP is the Read Pointer, T is the Real Time Pointer, OLT is the Output List Tail, OLH is the Output List Head, MCA is the Size of Calendar, VPI is the Virtual Path Indicator, VCI is the Virtual Channel Indicator.

In FIG. 2 there is also shown a table 46, which lists the VCI/VPI data that identifies the ATM cell address, the PCR intercell time, which represents the peak cell rate intercell time, and a further column identified as last cell time.

By placing the two calendars 30, 32 in series, cells A to D for example, may be scheduled independently in each calendar in their respective cell memory 48, 50 in accordance with the read pointer of RP and the real time pointer T.

In operation, cells leaving the sustainable cell rate calendar 30 are checked against the table values for the peak cell rate intercell time and the last time a cell was transmitted. If the intercell time will be less with this particular cell being transmitted immediately, the cell must be scheduled on the peak cell rate calendar 32 at an intercell time. The sustainable cell rate therefore guarantees the maximum ATM cell delay is not exceeded. The ATM cells are not placed on the peak cell rate calendar 32 unless the above mentioned PCR threshold might be exceeded. It is the scheduling on the peak cell rate calendar which determines when the cell is sent. In this manner it is possible to guarantee absolutely the minimum and maximum cell rate of a connection is observed.

It will be readily appreciated that there are various ways of implementing the control of the sustainable cell rate calendar and the peak cell rate calendar which fall within the scope of the present invention.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A means for queuing and scheduling ATM cells output from an ATM switch, comprising a first calendar having an input connected to the output of an ATM switch and a second calendar connected in series with the first calendar, said first calendar used for scheduling cells for transmission in accordance with a maximum delay value, said second calendar used for scheduling cells for transmission in accordance with a minimum delay value;

a buffer means connected to an input line at which ATM cells are received, a first control means for receiving for each cell a channel identifier and a path identifier from which a first signal is generated indicative of said maximum delay value, said first calendar in which said cell is scheduled for transmission in accordance with the maximum delay value being used to control a sustainable cell rate, an output line from said first calendar connected to a input of said second calendar, a second buffer means in said second calendar for receiving ATM cells from said first calendar, and a second control means for receiving a channel identifier and a path identifier corresponding to the received cell for generating a second signal indicative of said minimum delay value which is used to schedule the particular cell for transmission on said second calendar for controlling a peak cell rate and wherein the queuing and scheduling means dispatches cells from said first calendar and compares cells against a table of values for a peak cell rate intercell time and a last time the particular cell was transmitted and if the intercell time will be less when said cell is transmitted immediately, schedules said cell on the second calendar at said intercell time.

* * * * *